United States Patent [19]

Baumann

[11] Patent Number: 4,753,127

[45] Date of Patent: Jun. 28, 1988

[54] PEDAL CRANK MECHANISM COMPRISING A SPROCKET WHEEL

[76] Inventor: Ernst Baumann, Baumgasse 29-41/62/5, A-1030 Vienna, Austria

[21] Appl. No.: 894,299

[22] Filed: Aug. 7, 1986

[30] Foreign Application Priority Data

Aug. 12, 1985 [AT] Austria ............................. A2350/85

[51] Int. Cl.$^4$ .......................... G05G 1/14; B62M 21/00
[52] U.S. Cl. .................................. 74/594.1; 74/594.2
[58] Field of Search ............................. 74/594.1, 594.2

[56] References Cited

U.S. PATENT DOCUMENTS

| 634,278 | 10/1899 | Stilmant | 74/594.2 |
| 721,943 | 3/1903 | Dockstader | 74/594.2 |
| 1,021,957 | 4/1912 | Walter | 74/594.2 |

FOREIGN PATENT DOCUMENTS

| 423497 | 10/1937 | Belgium | 74/594.2 |
| 176493 | 4/1905 | Fed. Rep. of Germany | 74/594.2 |
| 915427 | 11/1946 | France | 74/594.2 |
| 933930 | 5/1948 | France | 74/594.2 |
| 2409183 | 7/1979 | France | 74/594.2 |
| 415272 | 8/1934 | United Kingdom | 74/594.2 |

Primary Examiner—Gary L. Smith
Assistant Examiner—Rodney M. Lindsey
Attorney, Agent, or Firm—Kurt Kelman

[57] ABSTRACT

In a pedal crank mechanism at least one curved coupling spring is provided for resiliently coupling the pedal crank and the sprocket wheel and is resiliently backed by at least one backing member carried by the sprocket wheel or by the pedal crank. The curved coupling spring engages the backing member at retaining means which are carried by the sprocket wheel or by the pedal crank, or at a point spaced from said retaining means. From the zone in which said coupling spring is backed by the backing member, the coupling spring extends so as to progressively increase its radial distance from the backing surface of the backing member.

7 Claims, 3 Drawing Sheets

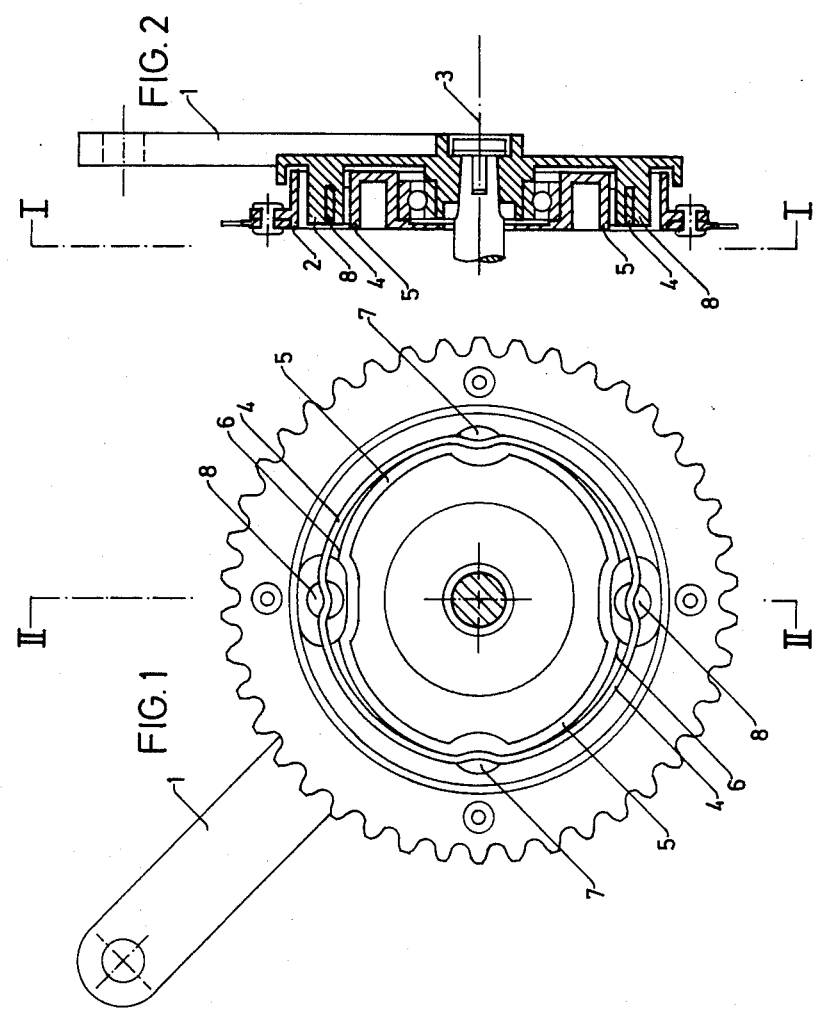

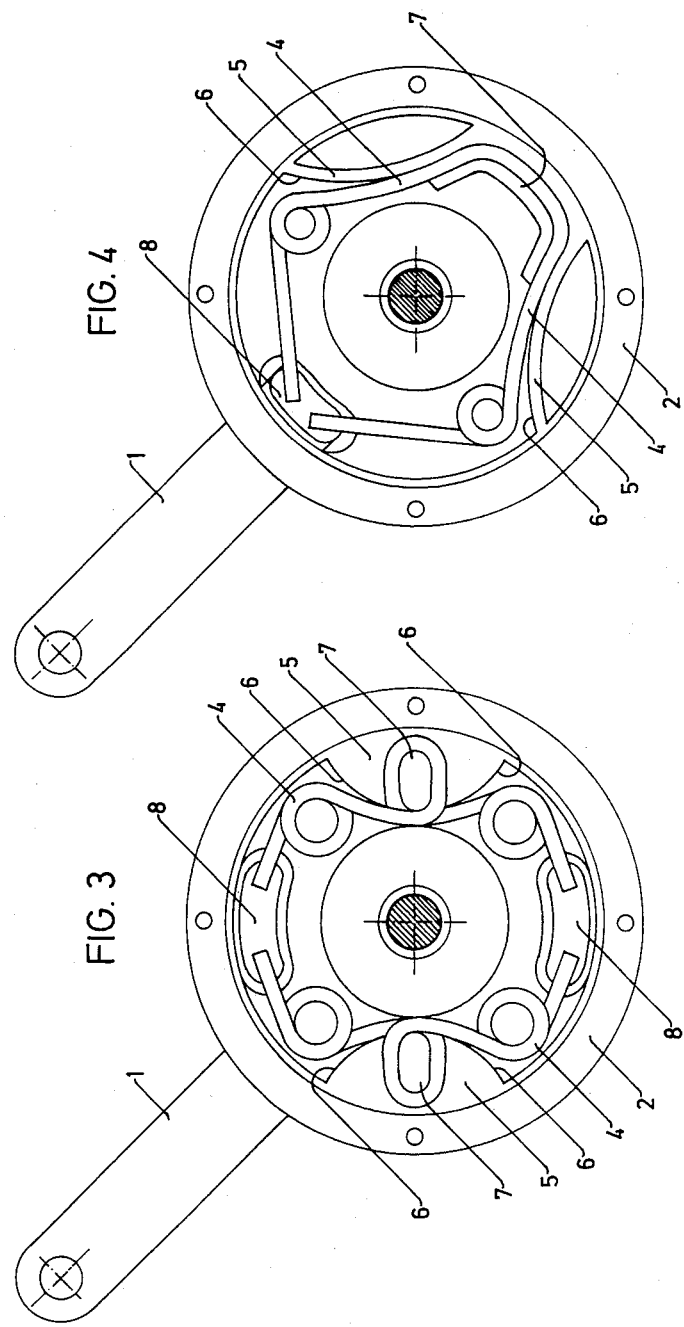

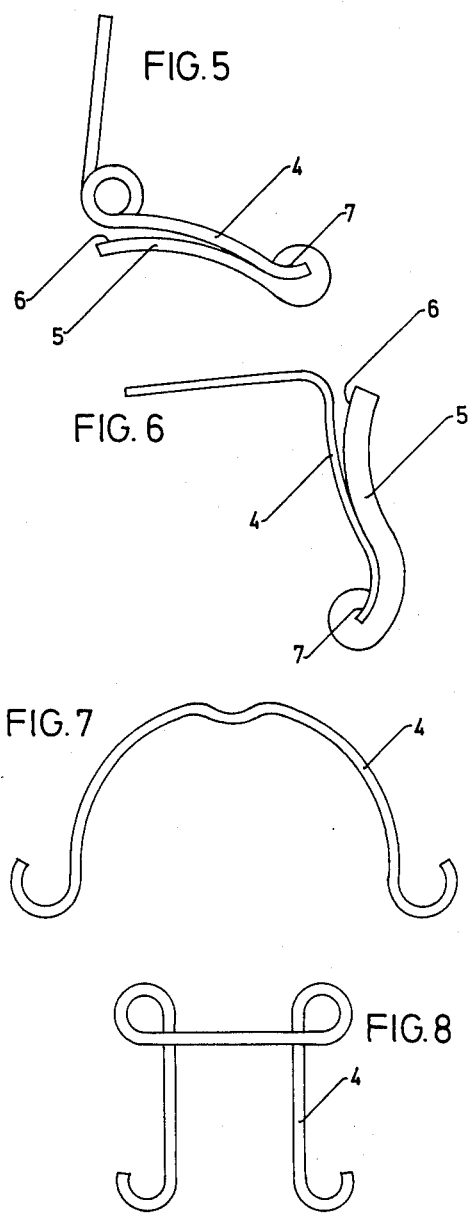

PEDAL CRANK MECHANISM COMPRISING A SPROCKET WHEEL

BACKGROUND OF THE INVENTION

1. Field of the Invention

This invention relates to a pedal crank mechanism comprising a pedal crank and a sprocket wheel which are angularly movable relative to each other and are resiliently coupled by at least one spring.

2. Description of the Prior Art

Pedal crank mechanisms comprising a sprocket wheel which is resiliently coupled to the pedal crank are known and have been disclosed in various patent specifications.

A disadvantage of the known pedal crank mechanisms of that type resides in that the coupling springs are of such a type that they can exert the required spring force only if they are large in size.

Besides, if the known pedal crank mechanisms which comprise coupling springs the course of the storage and release of energy is not satisfactory.

SUMMARY OF THE INVENTION

It is an object of the invention to provide a pedal crank mechanism which is of the kind described first hereinbefore and in which a given spring force can be exerted by a smaller spring and the course of the storage and release of energy is satisfactory.

This object is accomplished in accordance with the invention with at least one curved spring member resiliently coupling the pedal crank and the sprocket backed by the sprocket wheel and/or the pedal crank on a backing surface of a backing member in a backing zone disposed at at least one retaining device or at a distance therefrom. The curved spring member has a spring portion which extends from said backing zone and is spaced a progressively increasing distance from said backing surface.

When changing forces are exerted on the pedal crank mechanism in accordance with the invention, they will be transmitted by said mechanism in such a manner that the exertion of a peak force on the crank will result in a storage of energy by at least one spring, which is thus stressed, so that the rotation of the sprocket wheel resiliently coupled to the pedal crank by said spring will be slower than the rotation of the pedal crank during the exertion of such peak forces, and that the spring can subsequently relax in part to deliver the stored energy to the sprocket wheel so that the rotation of the sprocket wheel will then be faster than the rotation of the pedal crank.

As a result, the pedal crank mechanism can be moved more easily through its dead centers, i.e., through the vertical position of the pedal crank of a bicycle.

Further features of the invention will become apparent from the following description of preferred embodiments shown on the drawing.

BRIEF DESCRIPTION OF THE DRAWING

FIG. 1 is in part a side elevation and in a sectional view taken on line I—I in FIG. 2 through the axis of rotation of a pedal crank mehanism embodying the invention.

FIG. 2 is a sectional view taken on line II—II in FIG. 1.

FIG. 3 is a side elevational showing a pedal crank mechanism without the tooth-carrying portion of the sprocket wheel.

FIG. 4 is a side elevation showing a pedal crank mechanism in which the tooth-carrying portion of the sprocket wheel has been omitted and which comprises a single curved coupling spring.

FIG. 5 shows a curved coupling spring which has a helical hinge, viewed from one leg of the spring.

FIG. 6 shows a curved coupling leaf spring.

FIG. 7 shows another curved coupling spring.

FIG. 8 shows a curved coupling spring comprising two loops.

DETAILED DESCRIPTION OF THE PREFERRED EMBODIMENTS

With reference to the drawings, like reference numerals designating like parts in all figures, except that the like parts in the different embodiments have primed numerals or numerals followed by suffix a, b or c. The pedal crank mechanism comprises a pedal crank 1 and a sprocket wheel 2, which are mounted to be angularly movable relative to each other about the axis of rotation 3 of the mechanism.

FIGS. 1 and 2 show a curved coupling spring 4 having four sections each radially backed by a backing member 5 having four backing surfaces 6, facing the coupling spring sections and extending in the peripheral direction of the sprocket wheel 2. The curved coupling spring 4 is held by retaining means 7, against a movement in a generally peripheral direction. The retaining means are peripherally spaced apart and adjoin the backing surface 6 of the blocking member 5. The pedal crank 1 and/or the sprocket wheel 2 carries anchoring members 8, on which the coupling spring 4 is anchored or supported.

The curved coupling spring 4 preferably engages at least one backing surface 6 under an initial stress when the mechanism is in a condition of rest.

To ensure that the transition between the stressing and relaxing of the curved coupling spring 4 will be as gentle as possible, the mechanism comprises at least one pair of curved coupling spring sections which are backed by backing surfaces 6 under an initial stress so as to exert spring forces in mutually opposite peripheral directions.

In the illustrative embodiments shown in the drawing the curved coupling spring 4 is backed by at least one backing member 5 carried by the sprocket wheel 2 and is anchored on or supported by at least one anchoring member 8 carried by the pedal crank 1.

As is apparent from FIG. 2, the curved coupling spring 4 is backed by at least one backing member 5 which is disposed in the plane of the sprocket wheel 2.

The curved coupling spring 4 is anchored or supported on at least one anchoring member 8, which is carried by the pedal crank 1 and extends into the plane of the sprocket wheel 2.

In response to a torque exerted by a foot on the pedal crank 1, the anchoring member 8 will exert on the curved coupling spring section a compressive or tensile force in a peripheral direction, depending on whether the crank lags behind or leads the sprocket wheel. In either case, the area over which the curved coupling spring 4 is backed by the backing surface 6 of the backing member 5 will progressively increase in the peripheral direction.

As a result, the length of the lever arm which is constituted by the unbacked portion of the curved coupling spring section will decrease so that the resistance presented by the spring will increase.

This is an essential desired result produced by the arrangement of the curved coupling spring in accordance with the invention.

That length portion in which the curved coupling spring 4 is backed by the backing surface 6 of the backing member 5 may be straight in a relaxed state. The backing surface 6 which is formed on the backing member 5 and by which the curved coupling spring 4 is backed is suitably convexly curved and preferably extends along an arc of a circle in a radial plane.

Alternatively, that length portion in which the curved coupling spring 4 is backed by the backing surface 6 of the backing member 5 may be convexly curved toward the backing surface 6 in the peripheral direction when said spring member is relaxed. In that case the backing surface 6 of the backing member 5 may extend along a chord.

In order to optimize the cooperation between the curved coupling spring 4 and the backing surface 6, the curved coupling spring 4 may comprise at least one helix and/or at least one loop, as is apparent from FIGS. 3 to 5.

In that case the curved coupling spring 4 comprises spring legs, which extend from the helical or loop-shaped hinge and at least one of which cooperates directly with the backing surface 6 of the backing member 5.

To improve the dynamic balance of the mechanism, at least two curved coupling springs 4 may be provided, which are preferaby disposed on opposite sides of the axis 3, as is apparent from FIG. 3, which shows curved coupling springs 4 which are mirror images of each other.

It will be understood that other measures may be adopted to avoid a dynamic unbalance.

The curved coupling spring 4 shown in FIG. 1 is symmetrical in its entirety and may consist, e.g., of a spirally wound strip and in that case may comprise a plurality of layers or convolusions.

The curved coupling spring member 4 is preferably made of round-section material or of strip material.

A differentiated spring action can be obtained with a curved coupling spring 4 having length zones which differ in width and/or thickness and which are preferably tapered.

Because large forces, which may include frictional forces, will be exerted at the backing and backed surfaces, the backing surface 6 formed at the backing member 5 may be constituted by a material which is harder and/or has a higher abrasion resistance than the pedal crank 1 or the sprocket wheel 2 carrying said backing member 5.

For instance, the backing members 5 may consist of a material which is harder than the material of the sprocket wheel 2 and/or the crank 1.

It will be understood that the invention is not restricted to the illustrative embodiments shown on the drawing.

The backing member 5 may be so designed that it imparts an initial stress to the curved coupling spring 4.

For instance the backing member 5 which is formed with the backing surface 6 may be so designed and arranged that it is adapted to be forced against the curved coupling spring and to be fixed in position in pressure contact with the curved coupling spring and may optionally be readjustable.

That adjustment of the backing member 5 may be effected, e.g., by means of one or more screws, pins, eccentric pins, wedges or the like.

The anchoring member 8 may also be designed to impart an initial stress to the curved coupling spring 4.

In order to cause an initial stress to be imparted to the curved coupling spring 4 by the anchoring member 8, the curved coupling spring 4 may be pulled or pushed toward the backing surface 6 of the backing member 5 until the curved coupling spring 4 is under the desired initial stress and the curved coupling spring 4 is then fixed in the resulting position.

Screws, pins, wedges and the like may be used to subject the curved coupling spring 4 to an initial stress by means of the anchoring member 8.

For instance, the curved coupling spring 4 may be backed on one side by at least one backing member 5 carried by the pedal crank 1 and on the other side by at least one backing member 5 carried by the sprocket wheel 2.

If the curved coupling spring is arranged as just described, it will be subjected to a large excursion, which would be obtained if the curved coupling spring 4 was backed only by the pedal crank 1 or by the sprocket wheel 2.

The cross-section of the curved coupling spring 4 may be round, e.g., circular or elliptical, or may be rectangular, e.g., square, or may be triangular or may have another suitable configuration.

The embodiment shown in FIG. 1 comprises a single curved coupling spring 4 having two pairs of spring sections.

Alternatively, the spring coupling may comprise, e.g., one or two pairs of curved coupling springs 4, which in each pair are designed and arranged to constitute mirror images of each other.

FIG. 7 shows one curved coupling spring 4 constituting a pair of spring sections.

It will be understood that various means such as screws, clamps, pins or the like may be used to secure or anchor or back the curved coupling spring 4.

Various means such as screws, straining pins, wedges and the like may be provided to subject the curved coupling spring 4 to an initial stress.

The curved coupling spring 4 may be provided with reverse bends, helical portions, loops, crimps and the like formations for anchoring the curved coupling spring 4 on the crank 1 and/or to the sprocket wheel 2.

For instance, the curved coupling spring 4 may be substantially S-shaped.

The backing member 5 may substantially consist of a curved backing spring formed with a backing surface 6 which is convex in side elevation.

Straining means may be provided which are operable to increase the curvature of the backing spring 5 so that the convex curvature of the backing surface 6 can be increased too.

Such straining means may consist of screws, pins, eccentric pins, wedges and the like an may be so arranged that they direclty engage the backing spring 5 at one or more predetermined points, so that a curvature can be imparted to said backing spring or its curvature can be increased.

Similar straining means may be used to impart an initial stress to the curved coupling spring 4 or to increase the initial stress of said coupling spring.

The backing spring 5 may consist, e.g., of a flat strip, which may comprise one or more spring elements or may have one or more convolutions or layers.

Straining means consisting of screws, pins, eccentric pins, wedges, and the like may engage the backing spring 5, e.g., at one end or both ends thereof. In that case a curvature can be imparted to the backing surface 6 in that the distance between the ends of the backing spring 5 is decreased by such straining means.

Alternatively, a single straining element may be provided, which engages the at least one backing spring 5 at the center thereof and can be operated to increase the curvature of said backing spring.

The backing surface 6 of the backing member 5 may be substantially smooth, as is shown on the drawings. Alternatively, that backing surface may be corrugated or fluted or serrated or have a similar shape so that the coupling spring 4 will bear on the backing surface of the backing member 5 only at spaced apart points or on spaced apart length portions.

The backing surface 6 of the backing member 5 may be profiled in cross-section. In that case that portion of the coupling spring 4 which is backed or adapted to be backed can exactly be held in position or can be exactly guided.

The backing spring 5 may have the configuration of a ring which is closed in itself.

It will be understood that the curved coupling spring 4 may consist of a plurality of inherently rigid components, which are movably mounted, e.g., for a pivotal movement, in such a manner that the rise above the backing surface 6 can be increased.

The sprocket wheel 2 and the pedal crank 1 should be mounted to be angularly movable relative to each other with a minimum of friction. This is accomplished in accordance with FIG. 2 by the provision of a ball bearing. That ball bearing may be replaced, e.g., by a needle roller bearing or needle ball bearing, a roller bearing or a sliding surface bearing.

FIGS. 1 and 2 of the drawings show a sprocket wheel 2, which is provided with a gear disc. In the other figures the sprocket wheel is shown without its gear disc.

It will be understood that the sprocket wheel 2 may comprise two or three gear discs differing in size so that highly different transmission ratios can be obtained.

Alternatively, the sprocket wheel 2 may be integrally formed with the gears for meshing with the drive chain.

The pedal crank 1 may also differ in design from that shown on the drawings. Specifically, it may specially be designed for a saving in weight.

I claim:

1. A pedal crank mechanism comprising
   (a) a pedal crank part,
   (b) a sprocket wheel part,
      (1) the pedal crank and sprocket wheel parts being centered on a common axis and mounted for angular movement relative to each other about said common axis,
   (c) elastically deformable curved spring means interconnecting the pedal crank and sprocket wheel parts for transmitting torque between said parts upon said angular movement,
      (1) the curved spring means having two curved spring sections having opposing biases in response to said angular movement,
   (d) a retaining means holding one end of the curved spring sections on one of the parts, and
   (e) a backing member arranged on the one part adjoining the retaining means for changing the bias of the curved spring section, the backing member having
      (1) a respective backing surface facing each curved spring section for backing the same, the backing surface extending from the retaining means along the curved spring section and the curved spring section having a first portion adjacent the retaining means, the first curved spring section portion being backed by a portion of the backing surface, and a contiguous remaining curved spring section portion remote from the retaining means being spaced from a contiguous remaining portion of the backing surface, the contiguous remaining portion of backing surface and the contiguous remaining curved spring section portion defining a progressively increasing spacing therebetween whereby the bias of the curved spring section increases in response to said angular movement with an increase in the length of said first curved spring section portion backed by the backing surface.

2. The pedal crank mechanism of claim 1, wherein the curved spring means is comprised of two curved springs arranged oppositely each other with respect to the common axis, each of said curved springs having at least one of said curved spring sections, the curved spring sections having opposing biases in response to said angular movement.

3. The pedal crank mechanism of claim 1, wherein the curved spring means is comprised of a single closed curved spring having a plurality of adjoining ones of said curved spring sections having opposing biases in response to said angular movement.

4. The pedal crank mechanism of claim 1, wherein the backing surface facing the curved spring section is convexly curved.

5. The pedal crank mechanism of claim 1, wherein the curved spring section facing the backing surface is convexly curved.

6. The pedal crank mechanism of claim 1, wherein the backing member is a convexly curved backing spring.

7. The pedal crank mechanism of claim 1, wherein the curved spring means comprises a loop between a respective one of the curved spring sections and another end of the curved spring sections anchored to the other one of the parts, the loop operating as a hinge between the respective curved spring section and the other curved spring section end.

* * * * *